Aug. 26, 1930.   F. M. BUSSIÈRE   1,774,127
LIQUID LEVEL INDICATOR FOR VEHICLES
Filed Sept. 22, 1928
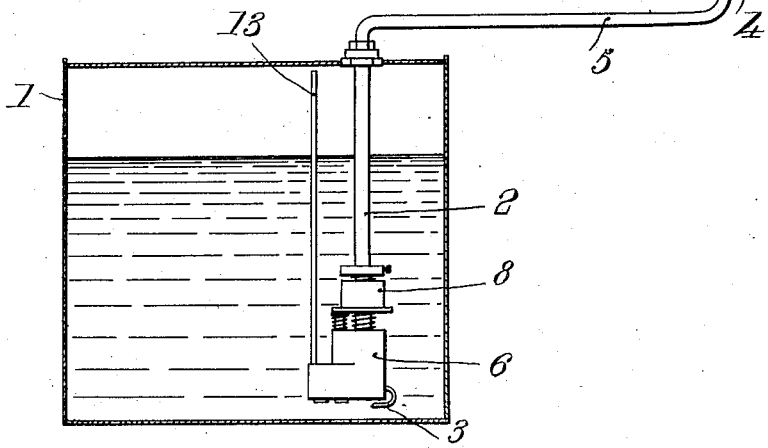
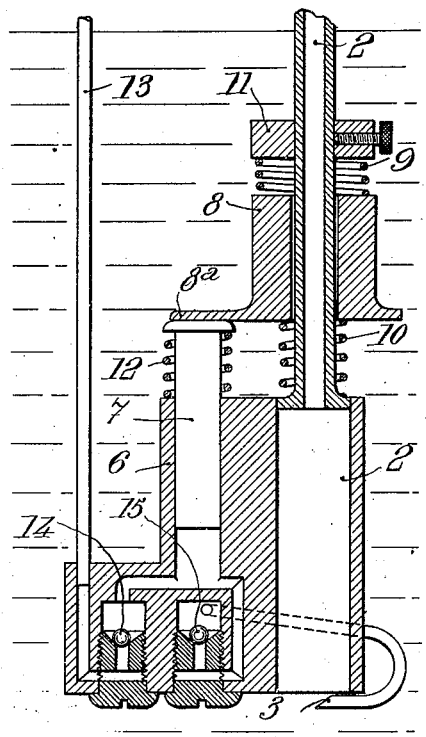
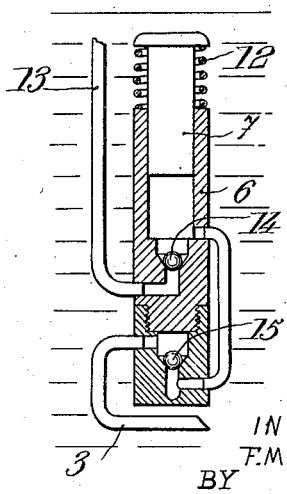
INVENTOR
F. M. Bussière
BY
Barnett & Barnett
ATTORNEYS Patented Aug. 26, 1930

1,774,127

UNITED STATES PATENT OFFICE

FRANÇOIS MARCEL BUSSIÈRE, OF LA VAREUNE, ST. HILAIRE, FRANCE

LIQUID LEVEL INDICATOR FOR VEHICLES

Application filed September 22, 1928, Serial No. 307,596, and in France September 30, 1927.

The present invention relates to level indicators for vehicles, and, more especially, to liquid level indicators for use in connection with the fuel tanks of automobiles.

One of the objects of the invention is to provide means for correcting the inaccuracies in air actuated level indicating devices due to the absorption of air by the fuel and to other causes.

Another object is to provide an air pump actuated uniquely by the vibration of the moving vehicle.

A further object is to produce an indicating assembly submergible in the liquid whose level is to be measured and operative by the vibration of the vehicle.

Still further objects will appear in the course of the detailed description now to be given with reference to the accompanying drawings, in which:—

Fig. 1 is a section through the tank showing the assembly in place;

Fig. 2 is a section through the pump and air chamber;

Fig. 3 represents, in section, a modification of the pump structure shown in Figs. 1 and 2.

Referring to the various figures of the drawing, 1 is a tank containing gasoline or the like,—2, an air chamber,—3, a conduit supplying air to chamber 2,—4, a pressure indicator,—5, a conduit for transmitting variations in pressure from chamber 2 to gauge 4,—6, a cylinder bored to receive a piston 7,—8 and 8ª, portions of a hammer suspended between springs 9 and 10 and operable to react on piston 7 under the vibratory impulses of the vehicle,—11, a collar for adjusting the tensions of springs 9 and 10 and acting as an abutment for the former,—12, a spring tending to maintain 8ª,—13, an air conduct having its free extremity near the top of the tank,—14 a ball controlling the intake side of the air-pump,—and 15, a similar ball controlling the outlet side.

The device operates as follows:—The up-and-down movement of the vehicle as it passes over uneven ground is communicated to mass 8, 8ª which "jiggles" up and down between springs 9 and 10 and delivers a series of impulses to piston 7. At each upward movement of element 7, air is sucked through conduit 13 past ball-valve 14 into cylinder 6. At each downward movement, the air in cylinder 6 is forced past ball valve 14 into conduit 3 whence it ascends into air chamber 2. As air chamber 2 fills, any liquid contained therein is forced back into the tank and when all the liquid has been displaced, the air in chamber 2 will be under a pressure which will vary as a function of the level of the liquid in the tank, this pressure being indicated by gauge 4. During refilling, the vehicle is at rest and the pump does not function. The fuel being charged will, consequently, rise part way into air chamber 2 and give a different reading than that which would be obtained by a change of level while the vehicle is moving. To correct for this effect, the dial of gauge 4 is graduated with a double scale, one serving for registration of level changes during normal operation and the other during refilling.

In the device shown in Fig. 3, the inlet and outlet ends of the pump are positioned one above the other, to save space, instead of side by side as in Fig. 2. This modification operates, of course, in all respects, in the manner as the one already described.

The pump-air-chamber assembly should, preferably be placed as low in the tank as possible, just enough space being left at the bottom to permit conduit 3 to be placed in position under chamber 2.

From the foregoing it will be seen that inaccuracies due to absorption of air by endosmose or otherwise are constantly corrected by a pump submerged in the fuel itself and actuated by the shocks transmitted thereto during movement of the vehicle. No extraneous power is necessary and the joints and valves are maintained tight by the liquid in which they are submerged.

It is to be understood that the invention is not limited to the particular structure described but embraces all possible equivalents that may suggest themselves to those skilled in the art. Thus the particular pump shown may be replaced by a diaphragm type of pump actuated by mass 8, or by any other device capable of delivering air under the action of impulses transmitted by said mass. Similarly mass 8, instead of acting directly on the piston may do so through the intermediary of a lever or other power multiplying device, mass 8, in that case, being positioned either inside or outside of the tank and transmitting its impacts through the particular mechanism interposed between it and the pump.

What I claim is:—

In combination with a vehicle, a tank adapted to contain a liquid, and a liquid level indicating assembly mounted inside said tank so as to be completely immersible in the liquid contained therein and comprising an elongated chamber adapted to contain a gas under varying pressures, said chamber having a lower open end, a conduit fitted to the upper end of said chamber and extending outside of the tank, a mass slidably mounted on said conduit, a pair of springs bearing in opposite directions against said mass, a pump provided with a piston, resilient means for maintaining said mass in contact with said piston, a conduit extending from near the top of said tank to the inlet side of said pump, and a conduit extending from the outlet side of pump to the lower open end of said chamber.

In testimony whereof I have hereunto set my hand.

FRANÇOIS MARCEL BUSSIÈRE.